Figure 1:
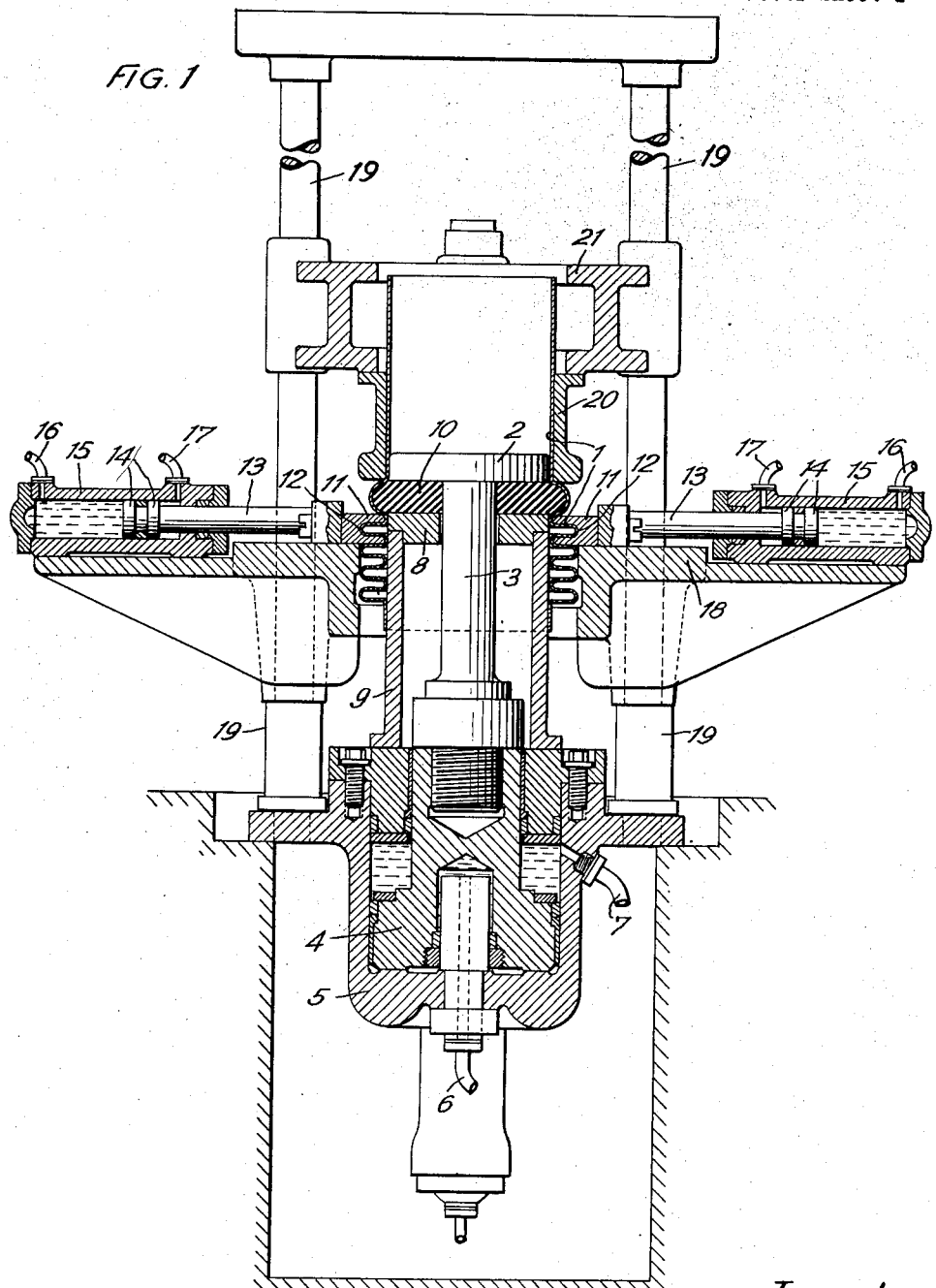

Jan. 8, 1952        A. DREYER        2,581,787

MANUFACTURING HIGHLY RESILIENT CORRUGATED TUBE

Filed Dec. 4, 1946        3 Sheets-Sheet 1

Inventor:
Albert Dreyer
by Sommers & Young
Attorneys

Inventor:
Albert Dreyer
by Sommers & Young
Attorneys

Jan. 8, 1952      A. DREYER      2,581,787
MANUFACTURING HIGHLY RESILIENT CORRUGATED TUBE
Filed Dec. 4, 1946      3 Sheets-Sheet 3
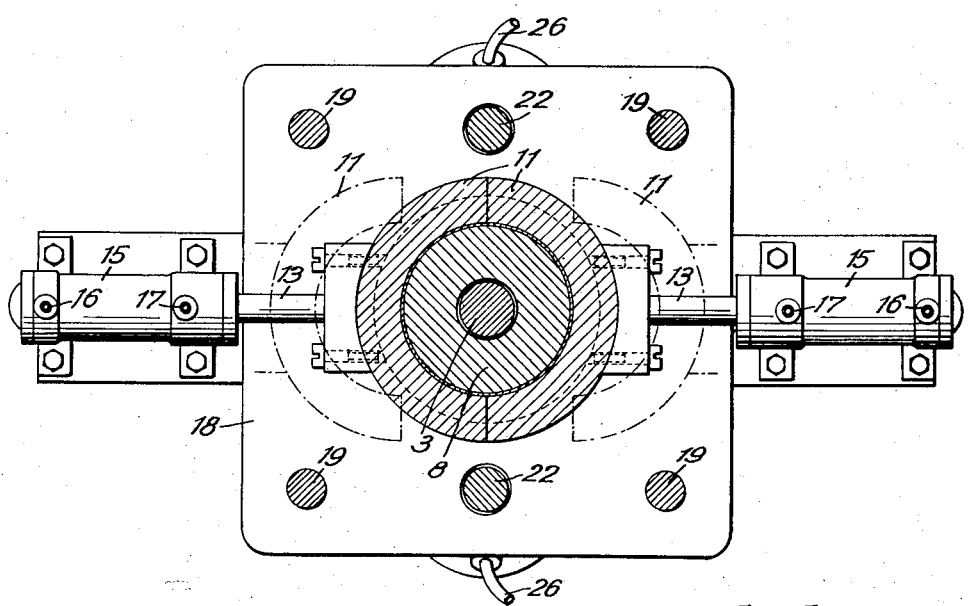
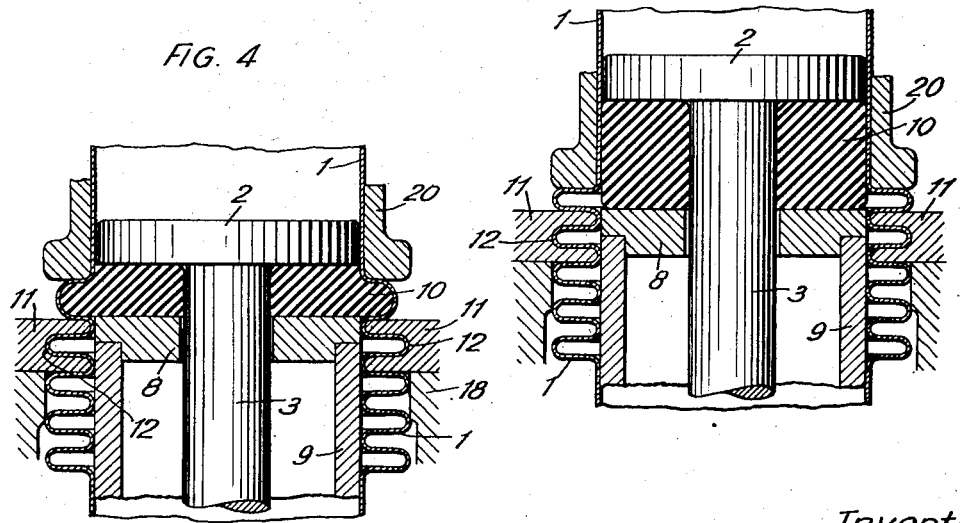
Inventor:
Albert Dreyer
by Sommers & Young
Attorneys Patented Jan. 8, 1952

2,581,787

UNITED STATES PATENT OFFICE 2,581,787

MANUFACTURING HIGHLY RESILIENT CORRUGATED TUBES

Albert Dreyer, Lucerne, Switzerland

Application December 4, 1946, Serial No. 714,034
In Switzerland December 27, 1945

1 Claim. (Cl. 153—73)

My present invention relates to a method of manufacturing highly resilient corrugated tubes, wherein the corrugations are cupped one by one from a thin-walled metal tube by elastic inside pressure, the said tube being drawn after automatically when cupping the corrugations.

A method, now, has already become known, wherein rather broad cylindrical wall portions are left between the corrugations produced by elastic inside pressure, upon which the corrugations are further formed by several rolling processes and the cylindrical wall portions deformed into the final corrugations. Such known method has proved suitable for the manufacture of corrugated tubes made of brass, tombac and similar alloys, but less suited for manufacturing tubes of stainless steel. As known, stainless steel hardens much quicker in cold working than brass alloys. Intermediate annealing is neither customary nor suitable in the manufacture of corrugated tube bodies, as the finished body then no longer possesses the necessary resilience. Further, an annealing of thin-walled corrugated tubes of stainless steel is extremely difficult, both on account of the required high temperature, whereby the corrugated tubes are easily warped, and of the requirement that annealing be carried out by excluding the air for the purpose of preventing any oxidation. Even the thinnest oxide film impairs the mounting of connections and end closures on spring bodies made of stainless steel by way of soft or hard soldering or welding, and the removal of such oxide film without attacking the base material is extremely difficult. Whereas corrugated tubes made of brass, tombak and similar alloys heretofore mostly have been made by forming approximately one half of a corrugation from the smooth tube inwardly and the other half outwardly, it is found that corrugated tubes of stainless steel frequently become brittle prematurely in the wave trough when the corrugations are formed as far inwardly as outwardly. Further, extreme stresses are set up in the material so that the finished corrugated tube often is not round or possesses unequal resilience. The corrugated tubes made of stainless steel, fabricated according to the known process, thus have to be given a corrugation of less depth, and their resiliency, therefore, is correspondingly impaired.

According to another known fabricating process, the tube to be worked up is held fast during the formation of the preliminary corrugation so that it cannot be drawn after while the latter are being cupped. Such process thus is only suited for fabricating corrugated tubes wherein the corrugations or creases possess a relatively small depth. Such process permits of fabricating flexible metal hose, but not corrugated tube of sufficient resilience such as, e. g., bellows for temperature regulators or axial compensators (pipe expansion joints).

According to my present invention, the preliminary corrugations formed in correspondence with the first-mentioned fabricating process are subsequently upset axially, whereby the inside pressure is maintained, at least during the initial stage of the upsetting operation. In this manner it is possible to obtain a highly elastic corrugated tube with a very great depth of corrugation in one operation, wherein, therefore, no further deformation by special rolling operations is required. The corrugated-tube material is not stressed as much, while being deformed, as in the known processes, since no rolling operations are required and since the tube is not held fast when forming the preliminary corrugations. The latter may be produced and upset on a usual press so that no costly special equipment is necessary.

Figure 2:
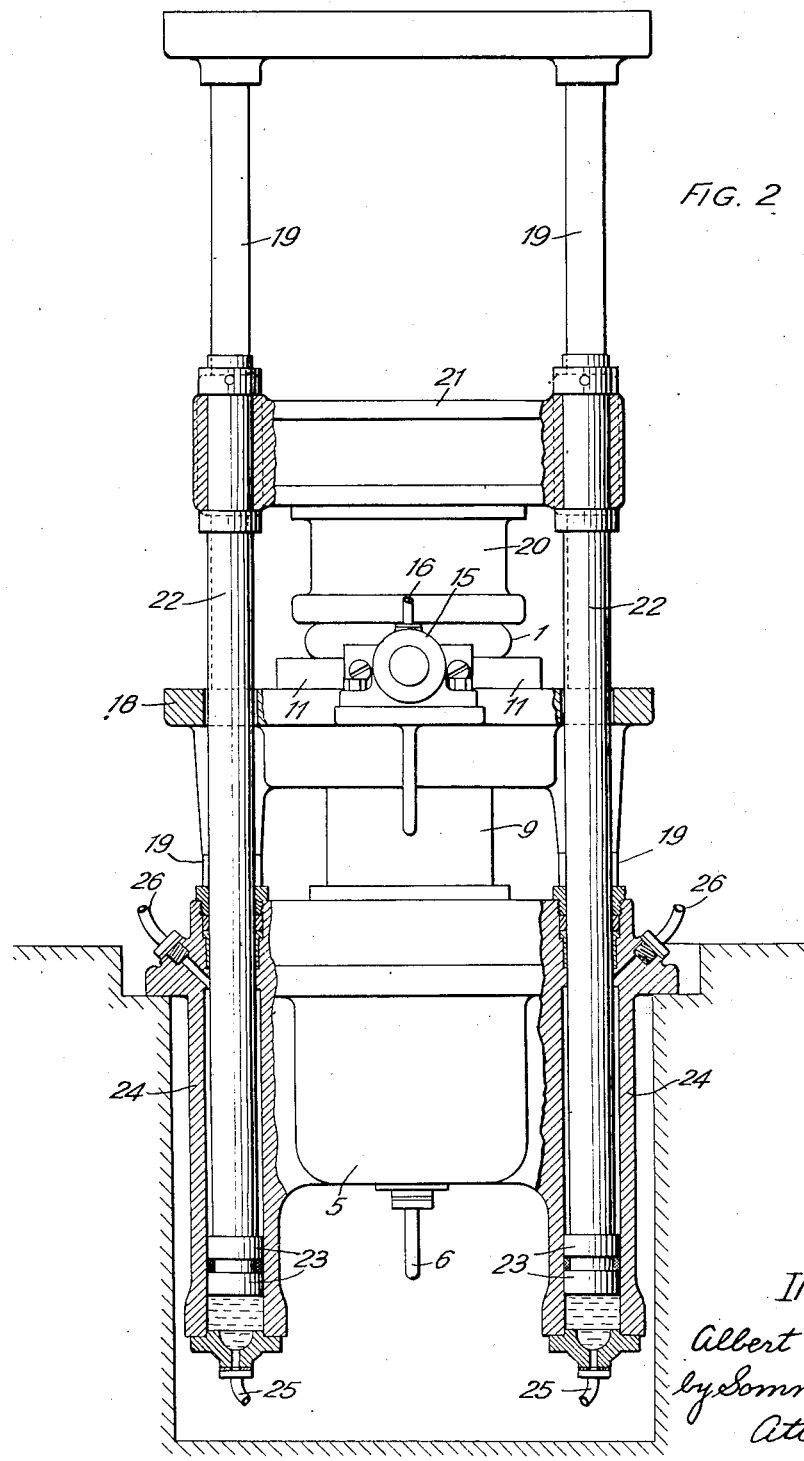

The inventive method of manufacture will now be described with reference to the accompanying drawings, which illustrate a form of device for carrying out such method, and in which:

Fig. 1 is a vertical section of the device, wherein the metal tube comprises a series of finished corrugations and a cupped or embossed preliminary corrugation, Fig. 2 a vertical partial section in a plane turned through 90° with respect to Fig. 1, Fig. 3 a horizontal section through the device, Fig. 4 a partial section from Fig. 1, illustrating the process of upsetting while maintaining the elastic inside pressure, and Fig. 5 shows in an identical section, the final stage of upsetting without applying any inside pressure.

The tube 1 to be made up into a corrugated tube, is inserted into the press either from above or laterally, in accordance with its overall length. A rod 3 is fastly secured to the metal stamp 2 at one end, and to a hydraulically controlled pressure piston 4 at its other end, by which it may be vertically displaced. The piston 4 is operating in a cylinder 5, to the two sides of which a hydraulic pressure means may be supplied through the pipes 6 and 7. When such means is supplied through pipe 6, the piston 4 with stamp 2 is raised, the means situated on top of the piston 4 being discharged through the pipe 7. If, vice-versa, the pressure means is fed through pipe 7 and drained through pipe 6, the piston 4 and stamp 2 are lowered. A rubber ring 10 is provided intermediate of stamp 2 and the head 8 of a tubular stationary counterstamp 9, and serves for cupping the corrugations. A die split into two half-portions 11, is provided with a groove 12 fashioned on the contours of a finished corrugation. Each die portion 11 is connected to a piston rod 13 which is secured to a piston 14 each, which latter is displaceable in a cylinder 15. A pressure fluid circulates through the pipes 16, 17 and the cylinders 15. The latter are disposed on a table 18 supported on four props 19. When the pressure fluid is fed through the pipes 16 and discharged through the pipes 17, the two die portions 11 are pressed toward each other, and press the tube 1 against the counterstamp 8, 9. When, vice-versa, the pressure fluid is fed through pipes 17 and carried off through pipes 16, the two die portions 11 are separated to occupy a position shown in Fig. 3 by dash-and-dot lines. In such latter position, the tube 1 may be axially displaced. An outer guide sleeve 20 for the tube 1 to be corrugated, at the same time serves as outside stamp when upsetting the cupped preliminary corrugation and is mounted in an axially displaceable yoke 21 of the press. The yoke 21 is guided axially displaceable on the said four props 19 and connected to two piston rods 22, the pistons 23 of which are guided in a cylinder 24 each, which latter are connected to pipes 25, 26 for feeding and discharging a pressure fluid. When such latter is supplied to the two cylinders 24 through pipes 25 and discharged through pipes 26, the pistons 23, plate 21 and guide sleeve 20 are raised. When, on the other hand, pressure fluid is fed through pipe 26 and discharged through pipe 25, the pistons 23, plate 21 and guide sleeve 20 are lowered.

The operation briefly is as follows:

Having inserted the tube 1 to be worked up, into the press, stamp 2 is lowered, and the rubber ring 10 is compressed between stamp 2 and head 8 of counterstamp 9 so as to cup a preliminary corrugation between the two die half-portions 11 and the guide sleeve 20 (Fig. 1). The latter and plate 21 then are depressed by lowering the pistons 23, thus upsetting the said preliminary corrugation while maintaining pressure on the rubber ring 10, the said corrugation thus being increased radially and decreased in the axial direction (Fig. 4). Stamp 2 then is lifted, until the rubber ring 10 is entirely relieved, whereupon the guide sleeve 20 is lowered until the corrugation has assumed its final wave contour (Fig. 5). The split die 11 then is thrown open and the tube 1 displaced downwardly by the width of one corrugation, i. e. until the corrugation just formed fits into the groove 12 of die 11, upon which the latter is closed again and the working cycle started over again.

What I claim and desire to secure by Letters Patent is:

The method of manufacturing highly resilient corrugated tubes by successively forming corrugations in an axially advancing thin-walled metal tube, the steps comprising cupping a preliminary corrugation in a portion of the tube by applying elastic pressure from the inside of the tube to the portion to be cupped while clamping immovable the tube ahead of the preliminary corrugation to be formed whereby the tube material in the rear of the corrugation to be formed is drawn axially towards the corrugation being formed during such cupping, axially upsetting the cupped preliminary corrugation, and maintaining the said elastic pressure during the initial phase of upsetting only, and effecting the final phase of upsetting without internal elastic pressure, the length of material used in forming the preliminary corrugation being the same as the length of the material contained in the final corrugation.

ALBERT DREYER.

REFERENCES CITED

The following references are of record in the file of this patent:

UNITED STATES PATENTS

| Number | Name | Date |
| --- | --- | --- |
| 1,689,620 | Clifford | Oct. 30, 1928 |
| 1,702,047 | Fulton et al. | Feb. 12, 1929 |
| 2,050,230 | Mantle | Aug. 4, 1936 |
| 2,306,018 | Fentress | Dec. 22, 1942 |